(12) United States Patent
Sakuma et al.

(10) Patent No.: US 6,170,902 B1
(45) Date of Patent: Jan. 9, 2001

(54) DOOR TRIM COVERING A DOOR FOR A VEHICLE

(75) Inventors: Tomonari Sakuma; Akira Kawai, both of Kanagawa-ken (JP)

(73) Assignee: Nissan Motor Co., Ltd., Kanagawa-ken (JP)

(*) Notice: Under 35 U.S.C. 154(b), the term of this patent shall be extended for 0 days.

(21) Appl. No.: 08/992,429

(22) Filed: Dec. 18, 1997

(30) Foreign Application Priority Data

Dec. 19, 1996 (JP) .................................................. 8-339826

(51) Int. Cl.⁷ ....................................................... B60J 5/04
(52) U.S. Cl. ....................................... 296/146.6; 296/146.5
(58) Field of Search ................................ 296/146.7, 189, 296/146.6, 146.5, 188, 39.1; 280/751, 752

(56) References Cited

U.S. PATENT DOCUMENTS

| | | |
|---|---|---|
| 3,989,275 | 11/1976 | Finch et al. . |
| 5,098,124 | 3/1992 | Breed et al. . |
| 5,154,445 | 10/1992 | Weller . |
| 5,306,066 | 4/1994 | Saathoff . |
| 5,787,645 * | 8/1998 | Heim et al. ............................. 49/502 |
| 5,871,253 * | 2/1999 | Erber ................... 296/146.6 |
| 5,934,730 * | 8/1999 | Yagishita et al. ................... 296/39.1 |

FOREIGN PATENT DOCUMENTS

| | | |
|---|---|---|
| 4-128912 | 11/1992 | (JP) . |
| 6-270679 | 9/1994 | (JP) . |
| 6270671 * | 9/1994 | (JP) .................................. 296/146.7 |

\* cited by examiner

Primary Examiner—D. Glenn Dayoan
Assistant Examiner—Mickki D. Murray
(74) Attorney, Agent, or Firm—McDermott, Will & Emery

(57) ABSTRACT

A resin trim body is mounted on an inner door panel of a vehicle door. A flange is provided at a peripheral edge portion of the trim body and extends toward the door inner panel. A rib or ribs which extend between and integrally interconnect the flange and the trim body, are each formed with a structure which focusses stress and defines a rupturable portion at a front end edge thereof.

19 Claims, 6 Drawing Sheets

DOOR TRIM COVERING A DOOR FOR A VEHICLE

RELATED APPLICATION

The content of application No. TOKUGANHEI 8-339826, filed Dec. 19, 1996, in Japan is hereby incorporated by reference.

BACKGROUND OF THE INVENTION

1. Field of the Invention

The present invention relates to a door trim mounted on the inside of a vehicle cabin door and more particularly to door trim that attenuates an impact force generated between a vehicle occupant and a side surface of the door during a side vehicular collision or the like.

2. Description of the Prior Art

Figure 5:
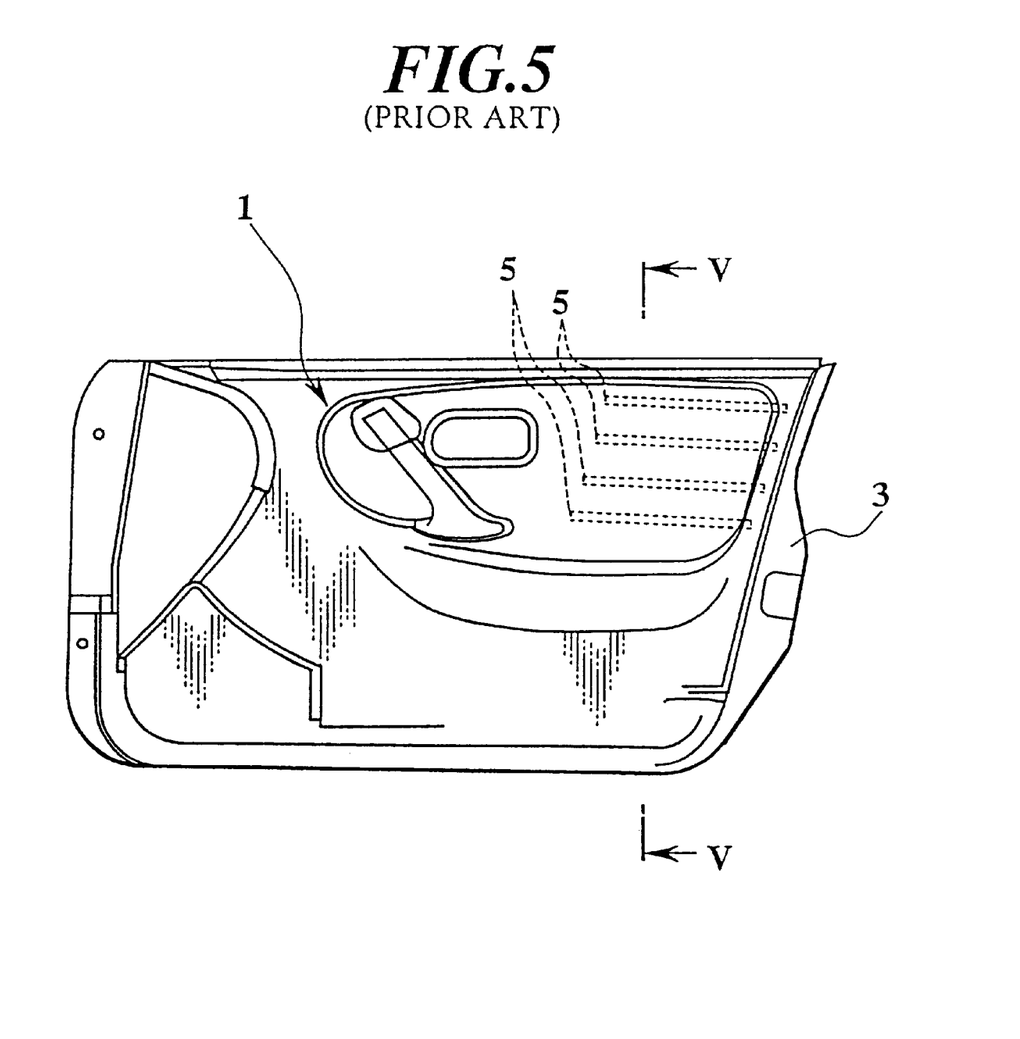
FIG. 5 is a schematic view which shows a vehicle door equipped with a door trim in accordance Japanese Utility Model Unexamined Publication No. 4-128912.
Figure 6:
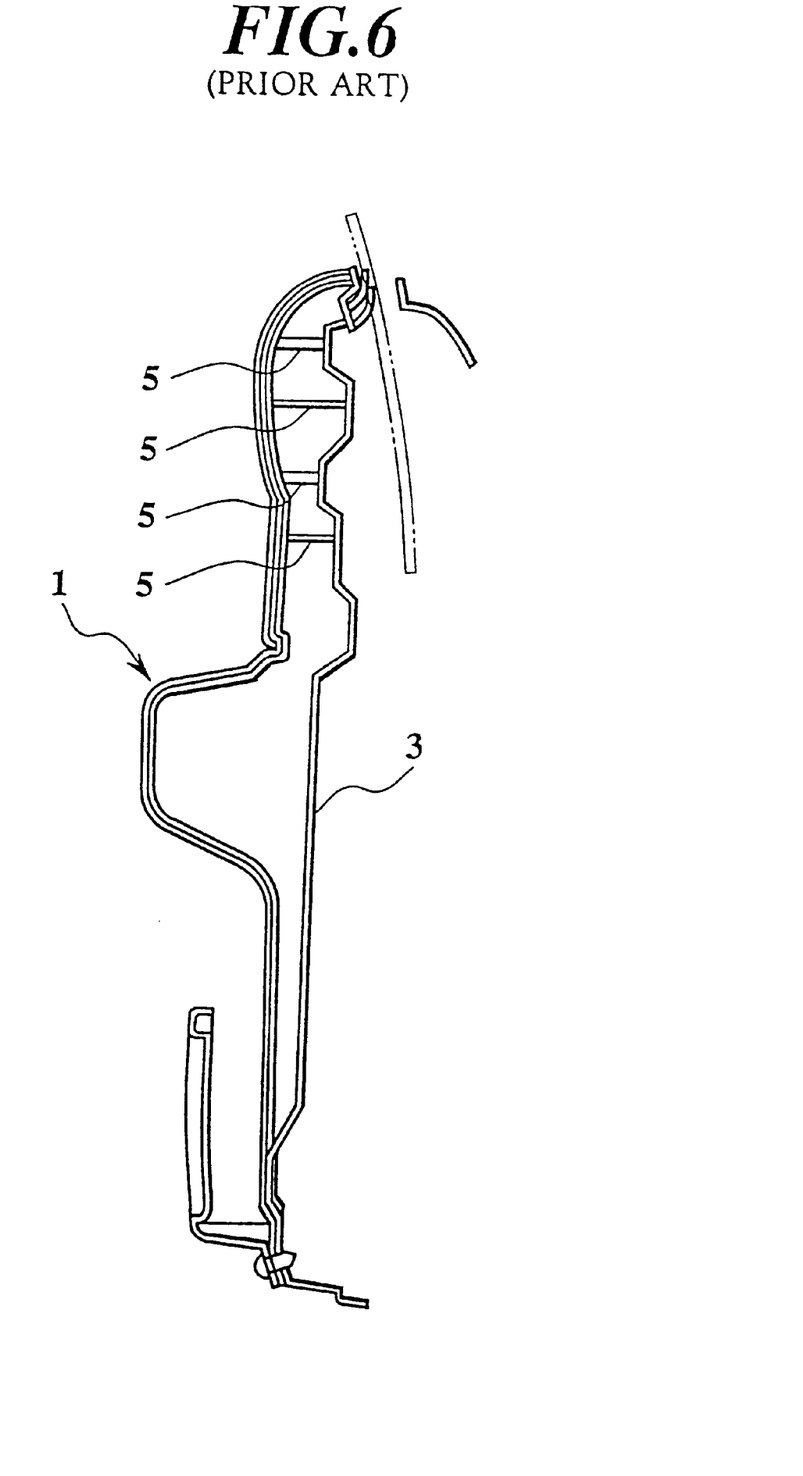
FIG. 6 is a cross-sectional view along a line VI—VI in FIG. 5.

A previously proposed door trim for improving shock absorbing effects at the time of side collisions on the vehicle, is disclosed in Japanese Utility Model Unexamined Publication No. 4-128912 (published Nov. 5, 1992), and is depicted in FIGS. 5 and 6 of this application. This door trim 1 is provided with a plurality of horizontal ribs 5 which are integrally formed in a back surface of the door trim 1. As shown in FIG. 5, these ribs extend in a longitudinal direction along the panel and are, as shown in FIG. 6, arranged to be in contact with a door inner panel 3.

When a shoulder or upper torso of a vehicle occupant is brought into contact with the door trim 1 at the time of a side collision, the ribs 5 are crushed against the door inner panel 3 by the compressive force generated, thereby absorbing some of the collision energy and producing an energy absorbing effect. With this structure, no independent pad is required to be disposed between the ribs 5 and the door inner panel 3.

In order that the collapse of the ribs 5 absorbs the collision energy as mentioned above, it is important to set the ribs in such manner that they are simultaneously brought into contact with the inner panel 3 of the door, and thus undergo uniform collapse to ensure stable absorption of the impact energy. However, this arrangement has suffered from the drawback that since the door trim 1 and the door inner panel 3 may often not be assembled with the required degree of precision, there may be variation in the degree of contact between the ribs 5 and the door inner panel 3, so that there is risk that the panel will fail to stably absorb the impact energy produced by a vehicular collision.

SUMMARY OF THE INVENTION

Accordingly, an object of the present invention is to provide a door trim that can stably absorb energy even if there is some deviation in the precision with which the door trim and the door inner panels are assembled.

In accordance with the present invention, when a vehicle occupant comes into contact with the door trim during a side collision of the vehicle, a flange which is formed at a peripheral edge portion of the door trim, is forced against the door inner panel and tends to be driven in a direction with respect to the trim body that causes stress to be applied to a rib or ribs which span between and interconnect the flange and the door trim proper. The rib or ribs are arranged to have a shaped portion which facilitates rupture of the rib when it is exposed to sufficient stress. This allows the ribs to absorb energy as they are ruptured.

Another feature of the present invention is that the ribs are formed on a rear end of the trim body in the longitudinal direction of the vehicle body and are located in position above an arm rest formed in the trim body.

Since the vehicle occupant seated on the seat at the time of the side collision is brought into contact with the portion which is disposed at a rear side in the longitudinal direction of the vehicle body with respect to the door trim, and at the upper side of the door trim, energy absorption can be securely performed with respect to a point of application by providing the ribs in or near that portion.

A further feature of the present invention is that the trim body is provided with a protuberance positioned above the door arm rest, and the rib(s) extend between the flange portion and the protuberance.

Since the protuberance of the trim body and the portion surrounded thereby have a high rigidity, the load applied by the vehicle occupant can be securely transmitted to each rib by providing the ribs between the protuberance and the flange portion.

A further feature of the present invention resides in that a plurality of ribs are provided, thereby absorbing the energy more securely.

Embodiments of the trim body are formed of a synthetic resin which can be molded. However, the invention is not limited to molded products or to the use of synthetic resin.

BRIEF DESCRIPTION OF THE DRAWINGS

The various features and advantages of the present invention will become more clearly appreciated from the following description the embodiments of the invention taken in conjunction with the accompanying drawings in which like elements are denoted by like reference numerals, and in which:

FIGS. 3A, 3B, 3C, 3D, 3E and 3F are schematic views which depict the operation of the embodiment shown in FIG. 2, wherein FIG. 3A shows a state before collision, FIG. 3B shows a state resulting from a light collision, FIG. 3C shows a state resulting from a heavy collision, FIG. 3D is a graph showing a target F-S characteristic, FIG. 3E is a graph showing a change of a reaction force in correspondence to FIG. 3B, and FIG. 3F is a graph showing a change of a reaction force in correspondence to FIG. 3C;

DETAILED DESCRIPTION OF THE PREFERRED EMBODIMENT

Figure 1:
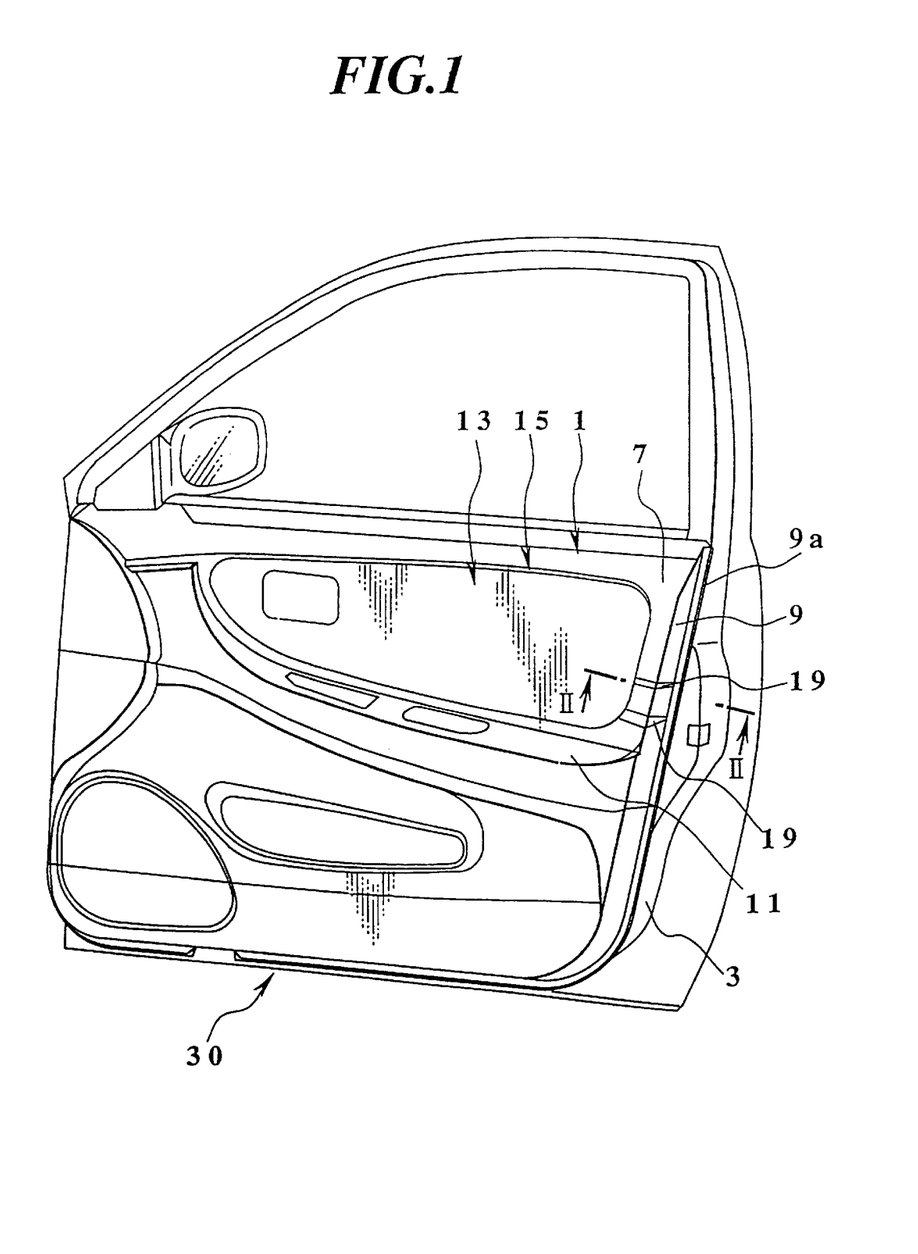
FIG. 1 is a perspective view of a first embodiment of the invention which shows a right front door of the vehicle as seen from inside the vehicle.
Figure 2:
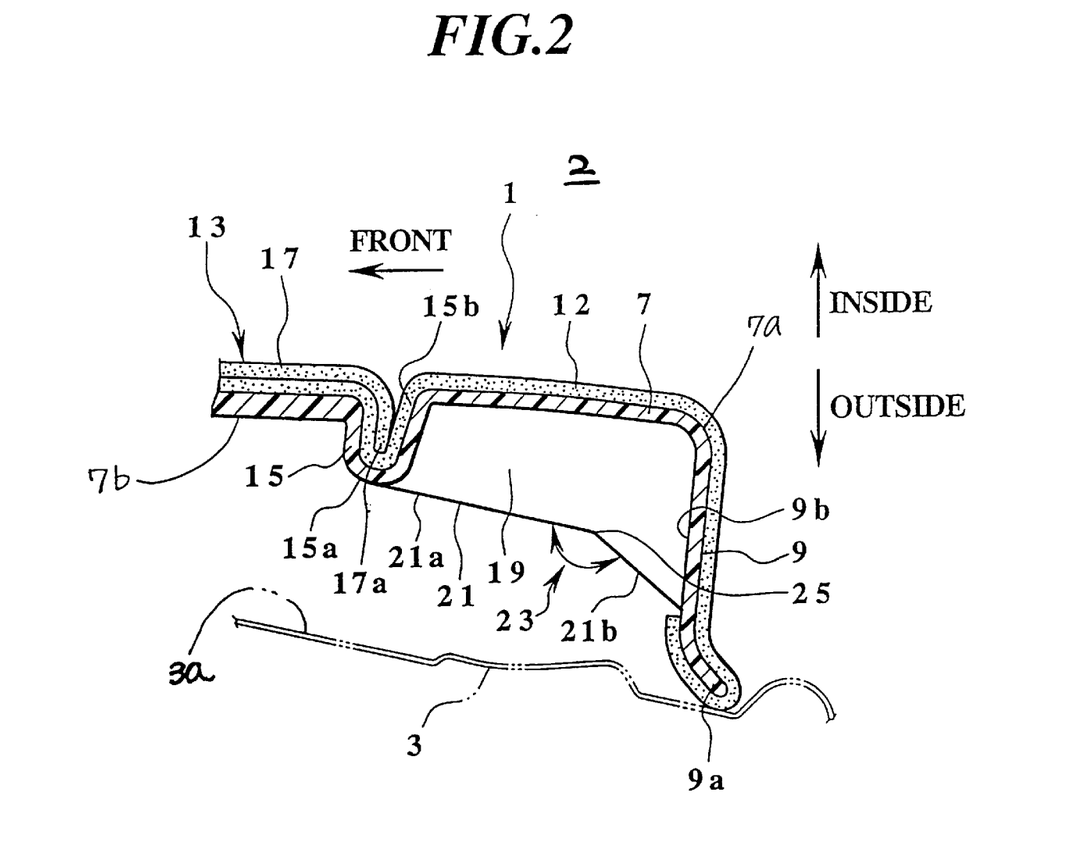
FIG. 2 is a cross-sectional view along a line II—II in FIG. 1.

As shown in FIGS. 1 and 2, a vehicle door 30 comprises a door inner panel 3 and a door trim 1. The door inner panel 3 has a cabin side surface 3a which faces a vehicle cabin 2. The door trim 1 is mounted on the door inner panel 3 so as to be exposed to the vehicle cabin 2. The door trim 1 is provided with a plane trim body 7 and a flange 9. The plane trim body 7 is formed using a conventional synthetic resin or the like, and covers the cabin side surface 3a of the door inner panel. The flange 9 is bent so as to extend laterally outward in an outboard direction (viz., toward the exterior of the vehicle) from a peripheral edge portion 7a of the trim body 7. The flange 9 engages the cabin side surface 3a of the door inner panel 3. The surface of the door trim body 7 and the flange 9 are covered by a first decorative layer or sheet 12.

A door arm rest 11 extending in the longitudinal direction of the vehicle body is integrally formed so as to project out at a mid portion of the trim body 7 in the illustrated manner. The trim body 7 has a concave center portion 13 formed above the door arm rest 11. The trim body 7 also has a protuberance 15 which projects in an outboard direction (viz., a direction away from the cabin 2) from a surface 7b of the trim body 7 so as to be essentially parallel to the flange 9.

As shown, the trim body 7 is provided about the periphery of the center portion 13. The U-shaped folded structure of the protuberance 15 defines a gap 15b which opens toward the vehicle cabin 2. An end 17a of a second decorative layer or sheet 17, which covers the center portion 15, and the first sheet 12 are snugly received in and are supported in the gap 15b of the protuberance 15. The protuberance 15 is located above the center portion 13 and disposed at a position which is located at an upper portion the trim body 7 and rearward in the longitudinal direction of the vehicle body.

The flange 9, which is positioned in the peripheral edge portion disposed rearward of the trim body 7 in the longitudinal direction of the vehicle body, is formed so as to be substantially perpendicular to the door trim body 7, as shown in FIG. 2. An end or terminal edge 9a of the flange 9 is curved toward the rear of the vehicle body.

A plurality of horizontal ribs 19 is integrally formed on the trim body 7 and the flange 9 rib, and extends between the flange 9 and the trim body 7. Each horizontal rib 19 is provided in such a manner as to extend between the flange 9 and the protuberance 15 in the upper portion of the trim body 7. In this embodiment, the plurality of ribs, for example, comprises two ribs disposed in parallel in the manner shown in FIG. 1. As shown in FIG. 2, each of the horizontal ribs spans from a back or sidewall portion 15a of the protuberance 15 to an inner surface 9b of the flange portion 9 and in a manner to extend close to the end 9a of the flange 9. A rupturable portion 23 is formed at a center portion of a front end edge 21 of the horizontal rib 19.

The rupturable portion 23 in this embodiment is constituted by an inflection point 25 comprising a recess-like corner portion formed on the front end edge 21 of the horizontal ribs 19. An obtuse open angle of the corner portion forming the inflection point 25 is set in accordance with the type of vehicle. A front edge portion 21a which is located forward of the inflection point 25, is formed so as to be parallel to a reference surface of the door inner panel 3, while a rear edge portion 21b which is located rearward of the inflection point 25, extends toward the flange 9 thus forming the set angle.

When the vehicle occupant seated on the seat is brought into contact with the door trim 1 at the time of a side collision, the door trim 1 receives the reactive force generated by the flange 9 which is forced into contact with the door inner panel 3, thereby transferring the load to the horizontal rib 19. Under these conditions, the load tends to concentrate at the inflection point 25 of the horizontal rib 19. When the load is small, a certain degree of load can be absorbed by deformation of the door trim 1. However, when the load is large, the horizontal rib 19 is ruptured due to the stress concentration so that the horizontal rib 19 absorbs an increased amount of energy.

Figure 3A:
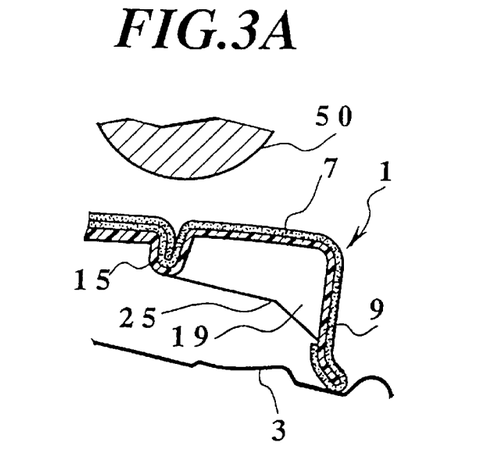
Figure 3B:
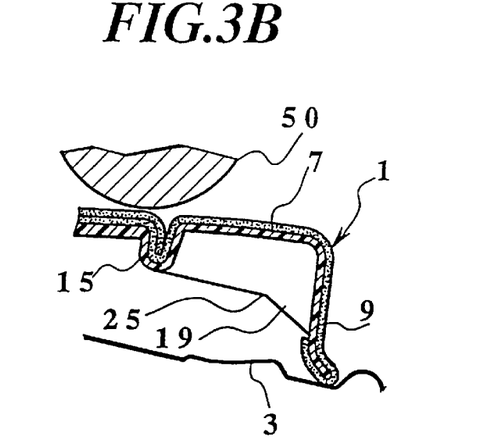
Figure 3C:
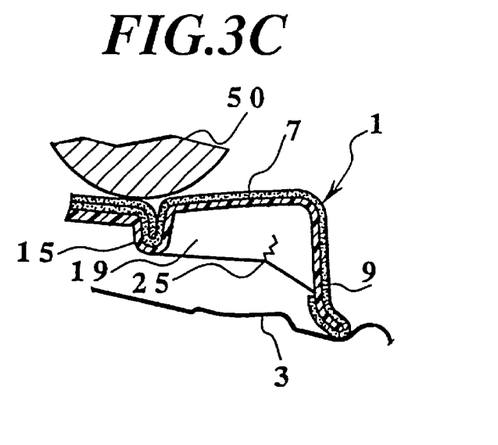
Figure 3D:
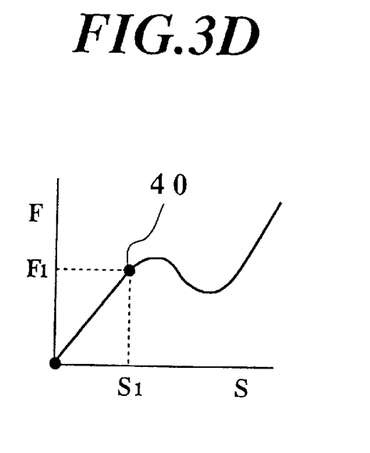
Figure 3E:
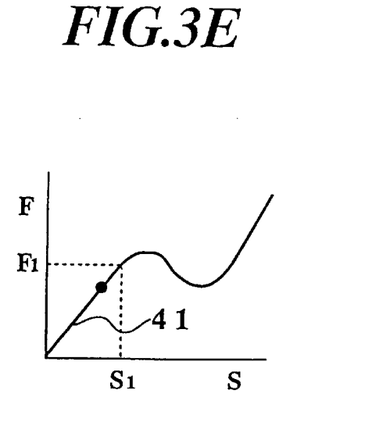
Figure 3F:
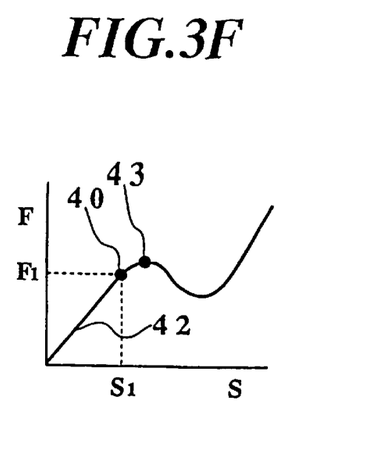

FIGS. 3A to 3F depict the operation of the energy absorption mentioned above. FIGS. 3A, 3B and 3C show the state before and after the load is applied respectively, and FIGS. 3D to 3F are graphs showing the relation (F-S characteristic) between a reaction force F applied the vehicle occupant and a deformation stroke S corresponding to a distance between the outermost portion of the vehicle door 30 and the vehicle occupant. FIG. 3D is a graph relating to a target F-S characteristic, set to pass a point 40 of F1–F2.

The point 40 is determined in the following manner. In order to render the reaction force applied to the occupant 50 due to the deformation of the door 30 as small as possible, the reaction force is made as large as possible during the period that the deformation of the door 30 is small. Further, the reactive force is selected in such manner that the injury of the vehicle occupant 50 is minimized.

When the vehicle occupant 50 is brought into contact with the door trim 1 as shown in FIGS. 3A to 3B, and the horizontal rib 19 is ruptured as shown in FIG. 3C, to assume a state shown in FIG. 3B, the reactive force F is increased along a target line as shown in a thick solid line 41 in the graph of FIG. 3E. An actual reaction force 42 passes through the point 40 in FIG. 3F corresponding to FIG. 3C, and the horizontal rib 19 is ruptured at a point 43 so that a peak value of the reactive force F will be caused to reduce.

The energy absorption can be securely performed by placement of the horizontal rib 19. Accordingly, selection of the F-S characteristic in the above manner can be easily made by determining the number of the horizontal ribs 19 and the open angle of the corner portion forming the inflection point 25.

The disclosed embodiment is formed of a synthetic resin and is formed using a molding technique. Accordingly, a plain recess-free rib or web is such that the ribs having the inflection point 25 can be more easily formed by molding than a structure which includes a notch or a more complicated configuration. That is to say, in the case where rupture is induced in a site of the edge of the rib via the provision of a notch, a protuberance must be provided in the mold during production. This protuberance may become weakened by fatigue due to thermal stress and the mold may tend to malfunction prematurely. This of course, makes it technically difficult to form the inflection point in such a manner under mass production conditions.

However, when the inflection point is formed by the open angle as mentioned above, the mold forming the inflection point 25 is both simple and stable, thereby improving the reliability with which production can be carried out.

Further, in accordance with the present invention, since the horizontal rib 19 is provided at a rear upper portion of the door trim 19, the load can be securely transferred onto the horizontal rib 19 when the vehicle occupant, who is seated on the seat, is brought into contact with the door trim 1. This of course makes it possible that energy absorption can be securely and reliably performed.

Still further, since the horizontal rib 19 is formed in such manner as to extend from the flange to the protuberance 15, the load can be transmitted from the protuberance 19 having a high rigidity. Accordingly, even when there is a difference in human body size and a difference in the longitudinal positioning of the seat, the load can be securely transmitted to the horizontal rib 19 through the rigid protuberance 15 since the vehicle occupant is brought into contact with the portion surrounded by the protuberance 15. This also ensures that energy absorption can be securely and reliably achieved.

Figure 4:
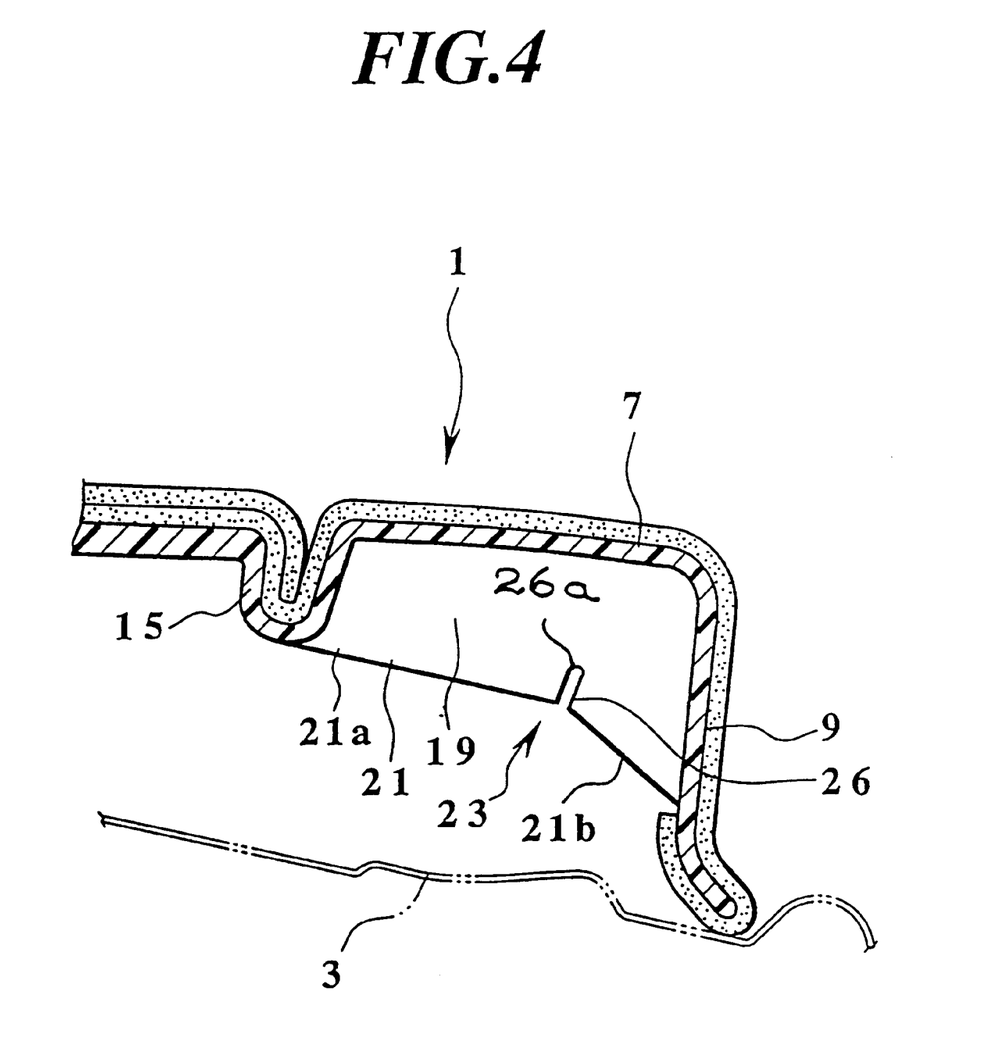
FIG. 4 is a cross-sectional view which shows a door trim in accordance with a second embodiment of the present invention.

FIG. 4 shows a second embodiment of the present invention. This embodiment features a structure wherein a notch 26 is formed at the rupturing portion or site 23. The structure of this embodiment is otherwise essentially identical with that of the first embodiment.

The notch 26 is used in the case when an external force greater than a predetermined value is applied to the horizontal rib 19. In this embodiment, a crack is generated at the bottom 26a of the notch 26 so that energy is absorbed. By changing the shape and size of the notch 26, the generated reaction force can be easily modified.

In this embodiment, an open angle is provided between the front end portions 21a and 21b which are respectively disposed frontward and rearward of the point in horizontal rib 19 in which the notch 26 is formed. The front end portions 21a and 21b can be formed in a straight line and only one notch 26 need be provided.

Further, in the above two embodiments, the front end portion 9a of the flange 9 and the door inner panel 3 are structured such as to be in constant contact with each other, although they may be separated from each other by a gap if so desired.

The invention has been described with reference to certain embodiments. However, as various changes and variations can be made thereto without departing from the scope of the present invention, obvious variations will be readily apparent to those skilled in the art when equipped with the above disclosure.

What is claimed is:

1. A door trim for a door inner panel of a door of a vehicle, comprising:
   a trim body, said trim body having a first surface which is exposed to an interior of the vehicle and a second surface which faces the door inner panel;
   a flange formed at an end of the trim body, said flange extending toward the door inner panel and having an edge portion which is outwardly angled with respect to the remainder of the flange and which is adapted to be engageable with the door inner panel; and
   a rib disposed between said trim body and said door inner panel which interconnects a portion of the second surface of said trim body and said flange, said rib having a flat upper surface and a flat lower surface which are both essentially normal to both the second surface and the flange, and an edge located opposite to and spaced from said door inner panel in which a localized stress concentrating rupturable energy absorbing portion is formed.

2. A door trim as defined in claim 1, wherein the edge of said rib comprises first and second edge portions which intersect with each other at a predetermined angle so that the intersection forms the rupturable portion.

3. A door trim as defined in claim 1, wherein the rib has a notch on the edge that forms the localized stress concentrating rupturable energy absorbing portion.

4. A door trim as defined in claim 1, wherein the rib is planar.

5. A door trim as defined in claim 1, wherein the rib is unitarily formed with the trim body and the flange.

6. A door trim for a door inner panel of a door of a vehicle, comprising:
   a trim body, said trim body having a first surface which is exposed to an interior of the vehicle and a second surface which faces the door inner panel;
   a flange formed at an end of the trim body, said flange extending toward the door inner panel and having an edge portion which is outwardly angled with respect to the remainder of the flange and which is adapted to be engageable with the door inner panel; and
   a rib disposed between said trim body and said door inner panel which interconnects a portion of the second surface of said trim body and said flange, said rib having an edge located opposite to and spaced from said door inner panel in which a localized stress concentrating rupturable energy absorbing portion is formed;
   wherein the trim body comprises an armrest on a surface facing a cabin of the vehicle, and the rib is formed on a rearward end of the trim body and at a location above the armrest.

7. A door trim as defined in claim 6, further comprising:
   a protuberance extending from the second surface of said trim body toward the door inner panel at a location above the armrest, the protuberance cooperating with the flange and a portion of a surface of the trim body to enclose the rib.

8. A door trim for a door inner panel of a door of a vehicle, comprising:
   a trim body, said trim body having a first surface which is exposed to an interior of the vehicle and a second surface which faces the door inner panel;
   a flange formed at an end of the trim body, said flange extending toward the door inner panel;
   a rib disposed between said trim body and said door inner panel which interconnects a portion of the second surface of said trim body and said flange, said rib having an edge located opposite said door inner panel in which a rupturable energy absorbing portion is formed
   wherein the trim body comprises an armrest on a surface facing a cabin of the vehicle, and the rib is formed on a rearward end of the trim body and at a location above the armrest;
   a protuberance extending from the second surface of said trim body toward the door inner panel at a location above the armrest, the protuberance cooperating with the flange and a portion of a surface of the trim body to enclose the rib; and
   wherein the protuberance includes a gap which is formed in the first surface of said trim body, said gap receiving an edge of a sheet covering the first surface of said trim body.

9. A door trim as defined in claim 4, wherein the rib extends horizontally with respect to said flange and the second surface of said trim body.

10. A door trim as defined in claim 5, wherein the trim body, the flange and the rib are formed of plastic.

11. A door trim as defined in claim 7, wherein the rupturable portion is formed in the rib between the protuberance and the flange.

12. A door trim as defined in claim 1, wherein the trim body comprises a plurality of ribs, each of said ribs being located at a different height on the trim body.

13. A door structure for a vehicle having a trim and an inner panel, wherein the trim covers the door inner panel, comprising:
   a trim body having a first surface facing an interior of the vehicle, a second surface facing the inner panel, and a flange which extends toward the inner panel and which has an angled terminal edge portion adapted to be engageable with the inner panel; and a rib interconnecting the second surface of the trim body and the flange, said rib having flat upper and lower surfaces which are essentially parallel and which extend normally with respect to both the second surface and the flange and which terminate in a single terminal edge located opposite the inner panel, said rib having a localized stress focussing rupturable portion formed in a predetermined portion of the edge.

14. A door structure as defined in claim 13, wherein said trim body, said rib and said flange are formed of a synthetic resin and are integrally molded in a unitary body.

15. A door structure for a vehicle having a trim and an inner panel, wherein the trim covers the door inner panel, comprising:

a trim body having a first surface facing an interior of the vehicle, a second surface facing the inner panel, and a flange which extends toward the inner panel and which has an angled terminal edge portion adapted to be engageable with the inner panel; and a rib interconnecting the trim body and the flange which is formed at an end of said trim body, said rib having a localized stress focussing rupturable portion formed in a predetermined portion of an edge of the rib which opposes the inner panel;

wherein said trim body is formed with an essentially U-shaped folded portion which forms a protrusion that extends in a direction essentially parallel to the flange and which forms a channel-like portion with the flange, and wherein said rib interconnects a side of the protuberance opposed to the flange with a major portion of a side of the flange opposed to the protuberance and wall portion of the trim body defined between the flange and the protuberance.

16. A door structure as defined in claim 15, wherein said rib has an edge having two essentially straight portions which join at a site where the rib will rupture in a manner which relieves stress applied by the trim body being forced toward the inner body and applying a bias to said flange which tends to increase the angle between said trim body and the flange.

17. A door structure as defined in claim 15, wherein said rib has an edge in which a notch, which extends toward said trim body, forms a site where the rib is apt to rupture and tear in a manner which relieves stress applied by the trim body being forced toward the inner body and applying a bias to said flange which tends to increase the angle between said trim body and the flange.

18. A door trim for a door inner panel of a door of a passenger vehicle, comprising:

a trim body, said trim body having a flange formed at an end thereof; and impact energy absorbing means interconnecting said trim body and said flange for absorbing impact energy applied to said trim body, wherein said impact energy absorbing means comprises a straight flat rib which is normal to both said trim body and the flange, said rib having a discrete edge located between and distal from both said door inner panel and said trim body, said rib having a structure, which concentrates stress and facilitates rupture and subsequent energy absorbing tearing of the rib in a predetermined location when a predetermined amount of stress is applied to the rib.

19. A door trim as defined in claim 18, wherein the structure comprises an angled portion which focuses stress that is applied to said rib, on a localized site whereat rupturing will occur upon application of the predetermined amount of stress to said rib.

* * * * *